Figure 1:
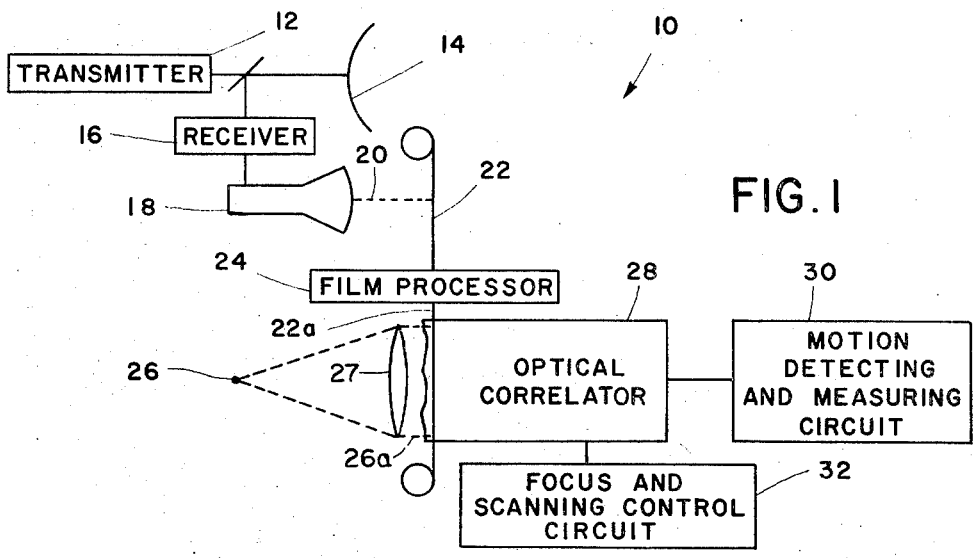

United States Patent [19]
Dotson

[11] 3,787,840
[45] Jan. 22, 1974

[54] RADAR MOVING TARGET PROCESSING METHOD AND APPARATUS
[75] Inventor: Charles R. Dotson, Litchfield Park, Ariz.
[73] Assignee: Goodyear Aerospace Corporation, Akron, Ohio
[22] Filed: Apr. 17, 1972
[21] Appl. No.: 244,365

[52] U.S. Cl............................ 343/7.7, 343/100 CL
[51] Int. Cl............................................... G01s 9/42
[58] Field of Search 343/5 CM, 5 MM, 100 CL, 7.7

[56] References Cited
UNITED STATES PATENTS
3,184,679 5/1965 Kuehne....................... 343/100 CL
3,483,557 12/1969 Skenderoff et al........... 343/100 CL

*Primary Examiner*—Maynard R. Wilbur
*Assistant Examiner*—G. E. Montone
*Attorney, Agent, or Firm*—J. G. Pere and E. W. Oldham

[57] ABSTRACT

A method and apparatus of processing side looking radar data to detect moving targets in a high clutter environment independent of the direction of the motion of the target. The radar phase history generated by a synthetic aperture radar system is processed in a radar optical correlator which has a scanning aperture placed at the azimuth transform plane. The amount of movement of the image of the viewing plane of the correlator as the scanning aperture moves is directly proportional to the movement of the target.

3 Claims, 4 Drawing Figures

PATENTED JAN 22 1974  3,787,840

RADAR MOVING TARGET PROCESSING METHOD AND APPARATUS

If two or more radar images are made at closely spaced instances in time, moving targets can be detected by comparing the images in a suitable display and noting these targets which move with respect to the fixed target background. A defocusing of the image of the moving target also results from the doppler frequency shift. The present invention provides a method of analyzing these effects to reveal the nature of the target motion.

In the present invention the phase history generated by a synthetic aperture radar system operating in the side-looking mode is supplied to an optical correlator which is provided with a scanning aperture at the azimuth transform plane. As the aperture is scanned across the image the out of focus spot which corresponds to a moving target will move on the viewing plane by a distance which is proportional to the amount of movement of the target during the time the target was illuminated by the radar antenna beam.

For a more complete understanding of the invention and the objects and advantages thereof reference should be had to the following detailed description and the accompanying drawings wherein there is disclosed a preferred embodiment of the invention.

Figure 2:
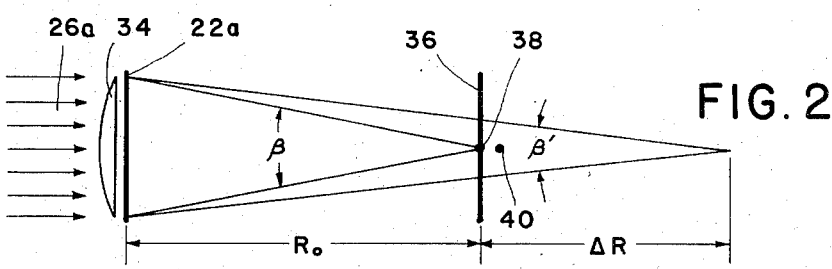
Figure 3:
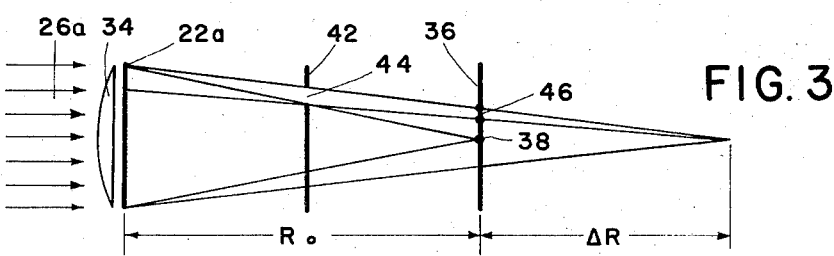
Figure 4:
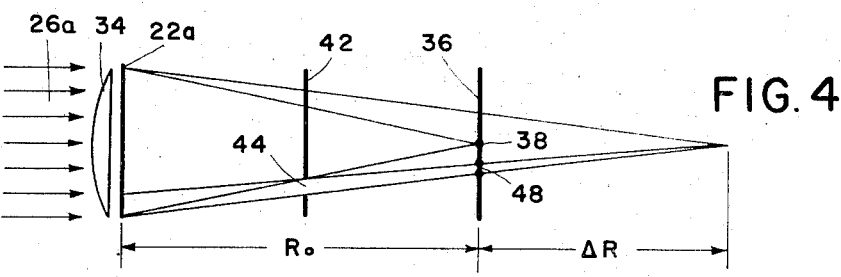

In the drawing:

FIG. 1 is a schematic showing of a synthetic aperture radar system employing the motion detecting operating correlator of the present invention; and FIGS. 2-4 are schematic showings of the optical correlator of the present invention and indicate the principles by which a moving target is detected.

In FIG. 1 reference numeral 10 designates generally the synthetic aperture radar and optical correlator system of the present invention. The synthetic aperture radar system may be of the type in the art and includes a transmitter 12 which transmits pulses to a radar antenna 14. Although not shown, the antenna 14 is carried by an aircraft and directs the radar beam at right angles to the path of aircraft travel. The reflected radar pulses from targets are received by the antenna 14 and transmitted to the receiver 16 which controls a cathode ray tube 18 to cause a beam of light 20 which is modulated in accordance with the received pulse. The modulated light beam 20 is caused to scan across a moving film 22 to record a phase history of the radar images the phase history data being recorded in the ordinary manner with azimuth information being recorded along the length of the film in the direction of the movement thereof and range information being recorded along the width of the film orthogonal to the movement thereof. The film 22 is processed by a suitable processing means 24. The portion of the system described above is conventional and well known to those skilled in the art.

In order to detect moving targets the processed film 22a is illuminated by a suitable light source 26 to project the phase history to the input of the optical correlator 28. As is well known in the art, light from a point source 26 is cast through a collimating lens 27 such that the light rays 26a emitted therethrough are collimated. Collimated light 26a then passes through the lens 34 of the optical correlator, the purpose of the lens being to focus the light rays 26a upon the data bearing film 22a in such a manner as to limit the divergence of the light within the correlator.

As is further well known in the art, the data recorded on the film 22a is recorded by the frequency modulation of the returning radar signals from the side-looking radar. All of the collimated light rays passing through the film 22a are characteristically deflected at an angle corresponding to the particular frequency or phase modulation of the data recorded on the film. A cylindrical lens (not shown) interposed between the film 22a and the map film 36 directs the deflected collimated light rays to a particular point 38 on the map film 36 in accordance with the angle of incidence of the collimated light with the cylindrical lens. The map film 36 moves simultaneously with the phase history film 22a and records thereon the various points 38 pertaining to the characteristics of the frequency or phase modulated data on the film 22a. It is readily apparent then that the map film 36 receives and records spacial values relating to the frequency or phase values recorded on the film 22a; the spacial values more readily appearing as a visual map. This technique and apparatus is of course well known and understood by those skilled in the art of radar map making.

Effectively then the data film 22a carries a transform function relating by phase or frequency the azimuth and range of targets within the reach of the radar system. The transform function is recorded along the length of the film 22a as a function of azimuth and hence the film 22 and planes parallel thereto are often referred to as azimuth transform planes.

DEFOCUSING EFFECT

Azimuth focusing results from the one-dimensional zone plate effect (Girard grill) of the recorded phase history which, to a first approximation, is $$\phi = (4\pi/\lambda) [R_o + (X^2/2R_o)]$$

where $R_o$ is the target distance perpendicular to the flight path, and $X$ is along track distance. For fixed targets the along track motion is just $$X = Vt$$

where V is the aircraft velocity. And a zone plate is formed with phase $$\phi = (4\pi/\lambda) [R_o = (V^2t^2/2R_o)]$$

which focuses at $R_o$ (in radar space).

The phase return from a moving target with velocity components $v_t$ tangential and $v_\perp$ perpendicular to the flight path is $$\phi = \frac{4\pi}{\lambda} \left\{ R_0 + \frac{[(V-v_t)^2+v_\perp^2]t^2}{2R_0} \right\}$$

Substitution of $V^2/V^2$ in the second part of the phase factor gives a relationship between phase for fixed and for moving targets $$\phi = \frac{4\pi}{\lambda} \left\{ R_0 + \left( \frac{[v_\perp^2 + (V-v_t)^2]}{V^2} \right) \frac{V^2t^2}{2R_0} \right\}$$

This focuses at $$\frac{V^2}{(V-v_t)^2+V_\perp^2} R_0.$$

The change in focal length for the moving target is $$\Delta R = R_0 \left[ \frac{V^2}{(V-v_t)^2 + v_\perp^2} - 1 \right]$$

The angle included by the focusing rays is $\beta$. See FIG. 2. For moving targets $\Delta R$ will be small compared to $R_o$ hence $\beta' \approx \beta$ so the diameter of the out-of-focus spot (ignoring diffraction limit) is $$d = \beta \Delta R$$

Where a limiting aperture 44 is inserted as shown in FIG. 3, only the intensity of the light is changed for the in-focus image 38. The out-of-focus image 46, however, is limited to only the upper portion of the original image 40. If the aperture 44 is moved to the position shown in FIG. 4, only the lower portion 46 of the out-of-focus image is seen. This change in position of the out-of-focus image is $d$ and varies directly with $\Delta R$ since $d = \beta \Delta R$. The amount of movement of the aperature plane 42 is proportional to $d$ and can be determined providing a method of obtaining the value of $d$.

The target velocity causing defocusing $\Delta R$ may be found from Equation (1) given above.

$$\Delta R = R_0 \left[ \frac{V^2}{(V-v_t)^2 + v_\perp^2} - 1 \right] \quad (2)$$

since $V \gg v_t$ and $V \gg v_\perp$ $$V^2/(V-v_t)^2 + v_\perp^2 \approx V^2/(V-v_t)^2$$

Using this approximation, the change in focal length is $$\Delta R = R_0 \left[ \frac{V^2}{(V-v_t)^2} = 1 \right]$$

The motion in the azimuth direction is $\beta \Delta R$ $$d = \beta R_0 \left[ \frac{V^2}{(V-v_t)^2} - 1 \right] \quad (3)$$

Thus sweeping the aperture of FIGS. 3 and 4 results in an image moving a distance $d$ on the map for a moving target velocity $v$. (Diffraction limit effects will be treated below.)

GROSS MOTION

Besides the defocusing effect described above, target images on the map will move because the target is changing position during the time the phase history is being recorded. The phase history length is $$L = \beta R_o$$

So assuming $V \gg v$ the time of recording is $t = \beta R_o/V$ and the motion of the target during this time is $$\vec{\Delta} = \vec{v} t = \vec{v} (\beta R/V)$$

which is $$\Delta = (\vec{v_t} + \vec{v}) (\beta R_o/V) \quad (4)$$

TOTAL MOTION

The image azimuth motion resulting from both effects may be found by combining Equations 3 and 4

$$M_{az} = d + \Delta = \beta R_0 \left[ \frac{V^2}{(V-v_t)^2} - 1 + \frac{v_t}{V} \right] \quad (5)$$

The image radial motion is from gross motion only and is given by Equation (4)

$$M_{rad} = \beta R_o V_\perp / V \quad (6)$$

The equation for azimuth motion is a cubic in $v_t$ and yields one real and two imaginary conjugate solutions. Because the real solution is the only realizable one, Equation (5) may be solved to yield a unique solution for a given azimuth velocity. Equation (6) is readily solved for radial velocity corresponding to image motion.

DIFFRACTION LIMIT

The in-focus image is approximately diffraction limited before the MTI detection aperture is inserted. The MTI aperture degrades the diffraction limit of resolution by the fraction of the beam it passes. The new diffraction limit is $$\omega_{MTI} = \lambda/d\, r$$

where $\lambda$ is the wavelength, $d$ the aperture width, and $r$ is the distance from the map plane to the aperture. For significant motion of an MTI image to be noted the motion must be greater than the new diffraction limit.

$$\omega_{MTI} < M$$

Substitution of Equation (5) and (7) gives minimum detectable azimuthal velocity $$\frac{\lambda}{d} r < \beta R_0 \left[ \frac{V^2}{(V-v_t)^2} - 1 + \frac{v_t}{V} \right]$$

and Equation (6) and (7) give minimum detectable radial velocity $$\lambda/d\, r < \beta R_o v_\perp/V$$

Hence, it is seen that the objects of the invention are achieved as the scanning aperture 44 sequentially samples light rays entering the field of view of the system. The light rays represent different sections of an appropriate data film which was exposed by the radar signal as the antenna scanned the ground. All stationary objects contribute an equal number of light rays to any part of the plane 42 carrying aperture 44, and aperture 44 does not cause image motion of stationary objects in the viewing plane. However, the image of all moving targets move on amount proportional to the amount moved on the ground during the time they were illuminated by the radar antenna beam. The detection of this motion by properly moving the aperture is the essence of the invention.

While only the best known embodiment of the invention has been illustrated and described herein, the invention is not limited thereto or thereby. Reference should therefor be had to the appended claims in determining the true scope of the invention.

What is claimed is:

1. A method of processing radar return signals to detect moving targets, comprising the steps of
    1. converting the return signals into optical signals;
    2. storing optical signals on film;
    3. projecting the stored information from the film to an optical correlator;
    4. passing a scanning aperture transversely across the projected image in the correlator;
    5. detecting the amount of movement of the image of the target; and
    6. calculating target movement from the detected movement.

2. The method according to claim 1 wherein the scanning aperture is located at the azimuth transform plane of the correlator.

3. The method according to claim 1 wherein target movement is calculated in accordance with the equations $M_{az} = \beta R_o [v^2/(V - v_t)^2 - 1 + v_t/V]$ and
$M_{rad} = \beta R_o v_\perp /V$, where
$\beta$ = angle included by the focusing rays,
$R_o$ = target distance perpendicular to flight path,
$V$ = aircraft velocity,
$v_t$ = component of target velocity tangential to flight path,
$v_\perp$ = component of target velocity perpendicular to flight path,
$M_{az}$ = image azimuth motion, and
$M_{rad}$ = image radial motion.

* * * * *

UNITED STATES PATENT OFFICE
CERTIFICATE OF CORRECTION

Patent No. 3,787,840      Dated January 22, 1974

Inventor(s) Charles R. Dotson

It is certified that error appears in the above-identified patent and that said Letters Patent are hereby corrected as shown below:

Column 2, line 47, 3rd equation " $R_o =$ " should be -- $R_o +$ --.

Column 3, line 43, 4th equation " $= 1$ " should be -- $- 1$ --.

Signed and sealed this 4th day of June 1974.

(SEAL)
Attest:

EDWARD M. FLETCHER, JR.
Attesting Officer

C. MARSHALL DANN
Commissioner of Patents